(12) United States Patent
Beierer et al.

(10) Patent No.: US 12,240,304 B2
(45) Date of Patent: Mar. 4, 2025

(54) APPARATUS FOR SUPPLYING FLUID TO AN ELECTRIC DRIVE TRAIN

(71) Applicant: MAN Truck & Bus SE, Munich (DE)

(72) Inventors: Philipp Beierer, Munich (DE);
Thomas Reiter, Munich (DE); Tim Schnädelbach, Pottenstein (DE);
Christian Kohrs, Plochingen (DE)

(73) Assignee: MAN Truck & Bus SE, Munich (DE)

( * ) Notice: Subject to any disclaimer, the term of this patent is extended or adjusted under 35 U.S.C. 154(b) by 0 days.

(21) Appl. No.: 18/025,848

(22) PCT Filed: Aug. 24, 2021

(86) PCT No.: PCT/EP2021/073403
§ 371 (c)(1),
(2) Date: Mar. 10, 2023

(87) PCT Pub. No.: WO2022/053308
PCT Pub. Date: Mar. 17, 2022

(65) Prior Publication Data
US 2023/0331076 A1  Oct. 19, 2023

(30) Foreign Application Priority Data
Sep. 10, 2020 (DE) .......................... 102020123590.9

(51) Int. Cl.
*F01M 1/12* (2006.01)
*B60K 1/00* (2006.01)
(Continued)

(52) U.S. Cl.
CPC ............. *B60K 1/00* (2013.01); *B60K 11/02* (2013.01); *F16N 7/40* (2013.01);
(Continued)

(58) Field of Classification Search
CPC .... B60K 1/00; B60K 2001/006; B60K 11/02; B60K 2001/003; F01M 2001/123;
(Continued)

(56) References Cited

U.S. PATENT DOCUMENTS 1,157,415 A * 10/1915 Norton ..................... F16H 39/14
60/487
5,775,881 A * 7/1998 Stich ........................ F01M 1/12
417/428
(Continued)

FOREIGN PATENT DOCUMENTS

DE        69609914 T2    2/2001
DE     102005013137 A1    9/2006
(Continued)

OTHER PUBLICATIONS

German Search Report issued in German Patent Application No. 102020123590.9 dated May 11, 2021. English translation not available.
(Continued)

*Primary Examiner* — Michael R Mansen
*Assistant Examiner* — Katelynne R Burrell
(74) *Attorney, Agent, or Firm* — Weber Rosselli & Cannon LLP (57) ABSTRACT

The present invention relates to a device (100) for supplying fluid to an electric drive train for a motor vehicle, preferably for cooling and lubricating a transmission (50) and/or for supplying oil to an electric motor of the electric drive train. The device (100) comprises a main pump (10) configured as a hydraulic fixed displacement pump for delivering fluid from a fluid reservoir (40) to the electric drive train. The apparatus (100) further comprises at least one auxiliary pump (20) configured as a hydraulic fixed displacement pump. The main pump (10) and the auxiliary pump (20) are
(Continued)

mechanically driven by the transmission (50) of the electric drive train in such a way that a fixed transmission ratio exists between a pumping rotation speed of the main pump (10) and a pumping rotation speed of the auxiliary pump (20), wherein the auxiliary pump (20) can be selectively connected by means of a controllable actuating device (30) for supplying fluid to the electric drive train.

21 Claims, 2 Drawing Sheets

(51) Int. Cl.
*B60K 11/02* (2006.01)
*F16N 7/40* (2006.01)

(52) U.S. Cl.
CPC .. *B60K 2001/006* (2013.01); *F01M 2001/123* (2013.01); *F16N 2210/04* (2013.01)

(58) Field of Classification Search
CPC ... F01M 1/02; F01M 1/12; F01M 1/16; F16N 7/40; F16N 7/38; F16N 2210/04; F16N 29/02; F16N 2280/02; B60Y 2306/03; F16H 61/00; F15B 11/17; F15B 2211/255
USPC .................. 184/6.12, 6.28; 417/287
See application file for complete search history.

(56) References Cited

U.S. PATENT DOCUMENTS

| | | | |
|---|---|---|---|
| 7,921,641 B2* | 4/2011 | Palo | E02F 9/2292 60/486 |
| 8,516,811 B2 | 8/2013 | Oka | |
| 8,640,452 B2* | 2/2014 | Schultz | F16H 61/0031 60/486 |
| 8,912,691 B2 | 12/2014 | Miyamoto et al. | |
| 9,853,523 B2 | 12/2017 | Caron et al. | |
| 2012/0040792 A1 | 2/2012 | Ito | |
| 2014/0126999 A1* | 5/2014 | Francis Lloyd | F16H 47/04 415/122.1 |
| 2017/0058728 A1* | 3/2017 | Lehman | F01M 1/02 |
| 2020/0102862 A1* | 4/2020 | Karlsson | F01M 1/16 |

FOREIGN PATENT DOCUMENTS

| | | | |
|---|---|---|---|
| DE | 102014215554 A1 | 2/2016 | |
| DE | 102015108031 A1 * | 11/2016 | ......... B60K 23/0808 |
| DE | 102015216737 A1 | 3/2017 | |
| KR | 1020160064358 A | 6/2016 | |
| WO | 2020001908 A1 | 1/2020 | |

OTHER PUBLICATIONS

International Search Report and Written Opinion dated Nov. 15, 2021 with English translation.

* cited by examiner

APPARATUS FOR SUPPLYING FLUID TO AN ELECTRIC DRIVE TRAIN

CROSS-REFERENCE TO RELATED APPLICATIONS

This application is a 371 application of PCT/EP2021/073403 filed Aug. 24, 2021 which claims benefit of and priority to German Patent Application Serial No. DE102020123590.9 filed Sep. 10, 2020, the disclosures of the above-identified applications are hereby incorporated by reference in their entirety.

The invention relates to a device for supplying fluid to an electric drive train for a motor vehicle, and to a motor vehicle, preferably a commercial vehicle, having such a device.

Various devices are known from the prior art for supplying oil to an electric drive train for a motor vehicle, for example to provide oil for cooling and lubricating a transmission or, in the case of a combined oil supply with an electric motor, also to provide oil for the electric motor.

The simplest type of oil supply is based on a fixed displacement pump, i.e. a pump with a constant displacement that is directly coupled to a drive. This results in a flow rate dependent on the drive rotational speed. In applications where the oil requirement for cooling and lubrication does not vary linearly with the rotational speed of the drive, there is a risk of oil undersupply if the pump rotates too slowly, with the risk of component failure due to, for example, insufficient lubrication or overheating. On the other hand, oversupply can also occur if the pump delivers more oil than is required for lubrication and cooling. As a consequence, this leads to a deterioration of the overall efficiency, since the excess oil is returned to the reservoir unused via a throttle. In parallel, the risk of unacceptable leakage increases, as the pressure in the system can rise above the usual range as a result of the excess oil.

Due to the aforementioned shortcomings, two variants in particular are used in the state of the art. On the one hand, simple fixed displacement pumps are combined with a speed drive having a variable rotational speed, e.g. an electric motor, which explicitly drives only the pump. This solution is very flexible and very well suited for a control method based on external variables. The disadvantage is the additional installation space required for the pump drive and the high costs resulting from the additional component, namely the motor intended only for driving the pump.

As a compromise, the use of variable displacement pumps, i.e. pumps with variable displacement, is known from practice. In this case, the drive is provided, for example, by a power take-off, i.e. the rotational speed cannot be adjusted as required to the requirements of the oil flow rate. Accordingly, the mass flow is changed as required by adjusting the pump displacement. In principle, both open-loop and closed-loop control are conceivable here for adjusting the displacement volume. The costs of this variant are usually between the solution having an electric drive and the variant having a fixed displacement pump on a power take-off.

It is an object of the invention to provide an improved device for supplying fluid to an electric drive train, with which disadvantages of known devices can be at least partially avoided. In particular, a device with improved overall efficiency, more compact design and/or more cost-effective manufacture is to be provided.

This object is achieved by the subject-matter according to the independent claim. The task is solved by the features of the independent claim. The dependent claims and the description refer to preferred embodiments of the invention.

According to a general aspect of the invention, a device for supplying fluid for an electric drive train for a motor vehicle is provided. The device for supplying fluid is preferably used for cooling and lubricating a transmission and/or for supplying oil to an electric motor of the electric drive train. The motor vehicle may be a commercial vehicle, preferably a commercial vehicle for transporting goods or passengers with a permissible maximum speed greater than 60 km/h.

The device comprises a first pump configured as a hydraulic fixed displacement pump for delivering fluid from a fluid reservoir to the electric drive train. The first pump is hereinafter referred to as the main pump. The device further comprises at least one second pump configured as a hydraulic fixed displacement pump, hereinafter referred to as an auxiliary pump. The main pump and the auxiliary pump are mechanically driven by the transmission of the electric drive train, such that there is a fixed transmission ratio between a pumping rotational speed of the main pump and a pumping rotational speed of the auxiliary pump. The transmission ratio can be 1:1 if, for example, the main pump and the auxiliary pump are driven by the same shaft of the gear unit.

The auxiliary pump can be selectively connected to the fluid supply of the electric drive train by means of a controllable actuator, i.e. the actuator can be controlled in such a way that the auxiliary pump either delivers to the same fluid circuit as the main pump or the auxiliary pump is only operated in recirculation mode so that its volume flow is only circulated in a subcircuit assigned to the auxiliary pump. Connecting the auxiliary pump is thus understood to mean connecting the fluid flow delivered by the auxiliary pump to the fluid supply of the electric drive train. Instead of just one auxiliary pump, several auxiliary pumps can also be provided, which can be selectively switched on by means of the controllable actuator for supplying fluid to the electric drive train.

Advantageously, at least two mechanically driven hydraulic pumps with constant displacement are thus provided, which can be combined as required in order to adapt their total displacement to the fluid requirements of the electric drive train. Sufficient fluid can be provided for the electric drive train and at the same time a fluid surplus can be kept as low as possible without the need for a separate pump drive. Thus, the device according to the invention can achieve an improved overall efficiency at low cost and low installation space requirements at the same time.

Thus, the respective volume flow of the main pump and the auxiliary pump is linearly dependent on the rotational speed of the gear unit. In contrast, the fluid requirement of the electric drive train is a function of the respective power. Accordingly, operating states of the electric drive train are conceivable which are, for example, decoupled from the vehicle speed or the pumping rotational speed. By selectively connecting the auxiliary pump to the fluid circuit, it is possible to cover the fluid requirement of the electric drive train effectively and continuously.

Another advantage is that the device is compact and inexpensive, since the two pumps do not require their own drives, e.g. their own electric motors, but are driven by the transmission of the motor vehicle. In addition, the main pump and the auxiliary pump are not configured as variable displacement pumps, but as much more cost-effective fixed displacement pumps.

A fixed displacement pump is a pump with a constant displacement volume. There is a known linear relationship between a pumping rotational speed and a displacement of the fixed displacement pump. The displacement of the main pump and the auxiliary pump can be identical or have any constant ratio relative to each other.

One of the two pumps, in this context the one referred to as the main pump, may continuously deliver fluid into the fluid circuit toward the electric drive train, at least during a direction of rotation of the transmission corresponding to forward travel of the motor vehicle. In other words, the main pump may be permanently connected to or connected to a hydraulic circuit of the fluid supply to the electric drive train. The at least one auxiliary pump that can be switched in can selectively deliver to the same hydraulic circuit as the main pump for supplying fluid to the electric drive train or can be operated only in recirculating mode, so that its volume flow is recirculated only in a subcircuit associated with the auxiliary pump. The optional switching on of the delivery flow of the auxiliary pump, so that it is conveyed to the electric drive for its fluid supply, takes place by means of the controllable actuator.

The fluid may be or include oil and/or other lubricants.

According to a particularly preferred embodiment, the main pump is fluidically connected to the electric drive train via a first fluid line, hereinafter referred to as supply line. The expression "fluidically connected to the electric drive train via a supply line" is understood to mean that the fluid flow delivered by the main pump is supplied via the supply line to a fluid circuit or fluid subcircuit which is provided for supplying fluid to the electric drive train of the motor vehicle, preferably for cooling and lubricating a transmission and/or for supplying oil to an electric motor of the electric drive train. According to this embodiment, the auxiliary pump is arranged in a second fluid line, hereinafter auxiliary line. To connect the auxiliary pump for supplying fluid to the electric drive train, the auxiliary line can be selectively fluidically connected to the supply line by means of the controllable actuating device, i.e. the auxiliary line can optionally be fluidically connected to the supply line or fluidically disconnected from it. According to this embodiment, the optional connecting of the auxiliary pump to the fluid circuit of the electric drive train takes place by optionally feeding the fluid flow delivered by the auxiliary pump into the supply line of the main pump, which is controlled by the actuator.

The controllable actuator can have a controllable valve device, preferably a mechanically, hydraulically, pneumatically or electrically controllable directional control valve. The directional control valve may be a proportional directional control valve. The valve device may be configured to fluidically connect the auxiliary line with the supply line when appropriately controlled, in order to connect the auxiliary pump for fluid supply to the electric drive train.

The controllable valve device may comprise a hydraulically controlled directional control valve. The hydraulically controlled directional control valve may be configured to automatically control the selective engagement of the auxiliary pump as a function of at least one state variable in the hydraulic circuit of the fluid supply. The state variable may be or comprise a pressure in the hydraulic circuit.

The pressure in the fluid circuit, e.g. oil circuit, results from the total flow rate and the flow resistances in the system. The latter increases e.g. disproportionately under cold operating conditions, when the starting viscosity of the fluid is significantly higher than the normal operating viscosity. The system pressure acts on the valve device, e.g. a directional control valve, via a suitable effective area, i.e. according to one embodiment it controls the valve device as the pressure rises in such a manner that the mass flow of the auxiliary pump is circulated wholly or partially in the auxiliary pump.

Alternatively, the controllable valve device may be or comprise an electrically controllable valve device, preferably an electrically controllable directional control valve. The device can be configured to electrically control the valve device as a function of at least one of the following variables: a data bus signal, for example a CAN signal (CAN: Controller Area Network), a measurement signal detected by sensors or provided by a vehicle computer, a gear ratio of the transmission, and on the basis of physical forces or pressure in the hydraulic circuit of the fluid supply. The vehicle computer may be a vehicle guidance computer. The above-mentioned variables could, for example, be recorded via suitable sensors or provided by the vehicle computer, processed further and sent as an output signal to the valve device and received by it as a control signal. The vehicle computer may optionally be configured, from one or more of the aforementioned variables, to derive on the one hand a measure of the fluid requirement for supplying fluid to the electric drive train and on the other hand, to derive and to determine the volume flow currently being delivered by the main pump and auxiliary pump, and to determine whether or not the auxiliary pump should be switched on for fluid supply and to control the valve device accordingly.

It was noted above that the main pump and the auxiliary pump are mechanically driven by the gearbox of the electric drive train. Preferably, both pumps may be directly coupled to a shaft of the gearbox. For example, the main pump and the auxiliary pump may be driven by the same gear shaft of the transmission and accordingly have the same rotational speed. Alternatively, the main pump and the auxiliary pump may each be driven by a different shaft of the gearbox and accordingly have a fixed transmission ratio between the two pumping rotational speeds. A volume flow delivered by the main pump and a volume flow delivered by the auxiliary pump depend linearly on a respective pumping rotational speed. The volume flow delivered by the main pump and the volume flow delivered by the auxiliary pump depend linearly on a drive speed of the respective driving shaft.

Advantageously, due to the same linear dependence on the drive rotational speed of the gear shaft, a simplified matching of the delivered volume flows of both pumps is possible in order to be able to set a desired total volume flow according to the fluid requirement of the electric drive train.

According to a further embodiment, the actuator can be configured to return a portion of the volumetric flow delivered by the auxiliary pump that is not used to supply fluid to the electric drive train to the fluid reservoir and/or upstream to the auxiliary pump via a return line. The terms "downstream" and "upstream" refer to the direction of flow of the fluid in a direction of rotation of the transmission when the vehicle is moving forward.

Advantageously, fluid can circulate in the subcircuit assigned to the auxiliary pump until it is fed into the supply line via the actuator for supplying fluid to the electric drive train.

According to a further embodiment, the device may further comprise a backflow preventer, preferably a nonreturn valve, arranged downstream of the main pump for preventing fluid backflow in the direction of the main pump, preferably when the rotational speed of the transmission is reversed, for example when the transmission is reversed. The backflow preventer may be arranged in the supply line.

Advantageously, the backflow preventer ensures that the main pump is disconnected from the hydraulic circuit of the fluid supply, especially when the direction of rotation is reversed.

According to a further embodiment, a first suction line can branch off from the supply line downstream of the main pump and open into the fluid reservoir. A first suction valve, preferably a nonreturn valve, can be arranged in the first suction line to prevent an underpressure at the main pump. Fluid can be supplied to the main pump via the first suction line when the direction of rotation of the transmission corresponds to reverse operation of the motor vehicle.

Advantageously, the first suction valve prevents impermissible underpressures or resulting damage therefrom to the main pump. It is also advantageous that the main pump can be operated in recirculating mode via the first suction line when the speed of the transmission is reversed, for example when the vehicle is reversing.

According to another embodiment, a second suction line can branch off from the auxiliary line downstream of the auxiliary pump and open in the fluid reservoir or in the auxiliary line upstream of the auxiliary pump. A second suction valve, preferably a nonreturn valve, can be arranged in the second suction line to prevent a vacuum at the auxiliary pump. Fluid can be supplied to the auxiliary pump via the second suction line when the direction of rotation of the transmission corresponds to reverse operation of the motor vehicle.

Advantageously, the second suction valve prevents impermissible underpressures or resulting damage therefrom to the auxiliary pump. It is also advantageous that the auxiliary pump can be operated in recirculating mode via the second suction line when the speed of the gear unit is reversed.

According to a further embodiment, the device can be configured in such a way that when the auxiliary pump is switched on, the volume flows of the main pump and auxiliary pump add up to supply the electric drive train and, when the auxiliary pump is not switched on, its volume flow is only circulated in the subcircuit assigned to the auxiliary pump.

According to a further embodiment, the main pump can be operated in recirculating mode when the rotational speed of the transmission is reversed, in particular when the motor vehicle is reversing, i.e. its volume flow is recirculated in recirculating mode only in a subcircuit assigned to the main pump. According to this embodiment, the controllable actuator is configured to switch on the auxiliary pump only when the rotational speed of the transmission is reversed, so that the electric drive train is supplied with fluid only by the main pump when the motor vehicle is moving forward, while the auxiliary pump is switched to circulating mode, and is supplied with fluid only by the auxiliary pump while the main pump is switched to circulating mode when the motor vehicle is moving backward.

Advantageously, the main pump and the auxiliary pump according to this embodiment can be dimensioned and configured in such a way that the respective volume flow delivered by them is specifically adapted to the fluid requirement of the electric drive train during forward travel or reverse travel of the motor vehicle. In the case of the rotational speed reversal of the transmission, the proportion of the volumetric flow delivered by the auxiliary pump that is used to supply fluid to the electric drive train can, for example, be specifically adapted to a speed range during reverse travel.

According to a further embodiment, a first reversing valve may be associated with the main pump to control a direction of flow through the main pump depending on a direction of rotation of the gearbox.

Alternatively or additionally, a second reversing valve can be assigned to the auxiliary pump, which controls a flow direction through the auxiliary pump as a function of a direction of rotation of the transmission. The main pump can be assigned a shut-off valve for disconnecting the main pump from the supply line when the speed of the transmission is reversed, in particular when the motor vehicle is reversing.

Advantageously, the main pump or the auxiliary pump can continue to deliver fluid into the hydraulic circuit even when the speed is reversed. It is also advantageous that the fluid can be conveyed into the hydraulic circuit exclusively by the auxiliary pump when the speed is reversed, with the main pump being disconnected from the supply line by the shut-off valve. Ideally, the position of the respective changeover valve is directly coupled to the direction of travel.

The controllable valve device can be switchable between a first position and a second position. In the first position, the volume flow of the auxiliary pump can be completely supplied to the electric drive train and, in the second position, it can only be circulated in a subcircuit assigned to the auxiliary pump.

According to a first variant thereof, the controllable valve device can only be switchable between the first and second position. In other words, the valve device operates digitally (discretely) or approximately digitally, so that the auxiliary pump, for example, either switches 100% to the main pump or only delivers internally in the circuit.

Alternatively, according to a second variant, the controllable valve device can additionally be switched to intermediate positions in which the distribution of the volume flow is proportional to the valve input signal. For this purpose, the valve device can be configured, for example, as a proportional directional control valve. Advantageously, the proportion of the volumetric flow delivered by the auxiliary pump, which is added to the volumetric flow of the main pump when the auxiliary pump is switched on, can be set in such a way that the total volumetric flow can be adapted to the fluid requirement of the electric drive train. An undersupply of fluid to the electric drive train can be ruled out and an oversupply can be kept as low as possible so that the highest possible overall efficiency can be achieved.

According to another embodiment, the main pump and the auxiliary pump may have an unequal number of displacement elements and/or discharge cycles that are out of phase with each other.

Advantageously, the main pump and auxiliary pump can be combined in such a way that dynamic interactions due to mutual excitation are excluded or minimized as far as possible. As is known from the prior art, pumps with an integral number of displacement elements tend, due to their design, to generate flow pulsations and thus mutual excitation. To avoid such effects, the main pump and the auxiliary pump can, for example, have an unequal number of displacement elements so that an unequal displacement volume of the main pump and the auxiliary pump can be set. A possible unequal displacement volume can alternatively, e.g. with the same number of displacement elements, also result from a smaller piston stroke or axially narrower gear wheel, e.g. in a gear pump, of one pump compared to the other pump.

The main pump and the auxiliary pump can have equal or unequal displacement volumes. The displacement of the main pump and the displacement of the auxiliary pump are in a fixed ratio to each other.

Advantageously, any delivery (displacement) volume ratio of main to auxiliary pump can be set not only via a fixed transmission ratio between both pumping rotational speeds, but also via a fixed ratio of both displacement volumes. This allows a simplified coordination of the delivered volume flows of both pumps in order to be able to set a desired total volume flow according to the fluid demand of the electric drive train. Furthermore, the ratio of the two displacement volumes can be selected in such a way that the fluid requirement can be covered by one of the two pumps depending on the direction of rotation of the transmission.

According to a further embodiment, the device can be operated in a neutral position of the gearbox.

Advantageously, it can be ensured that the fixed displacement pumps deliver fluid even when the motor vehicle is at a standstill and ensure, for example, continuous cooling and lubrication.

According to further general aspect of the invention, there is provided a motor vehicle, preferably a commercial vehicle, more preferably a commercial vehicle for transporting goods or passengers, further preferably having a maximum permissible speed greater than 60 km/h, comprising the device for supplying fluid as disclosed herein.

The previously described embodiments, variants and features of the invention can be combined with each other as desired. Further details and advantages of the invention are described below with reference to the accompanying drawings. The figures are showing.

Identical or functionally equivalent elements are designated with the same reference signs in all figures and are not described separately in some cases. For example, the reference sign 30 in FIGS. 1 and 3 designates an actuator, which can be configured differently depending on the embodiment and variant.

Figure 1:
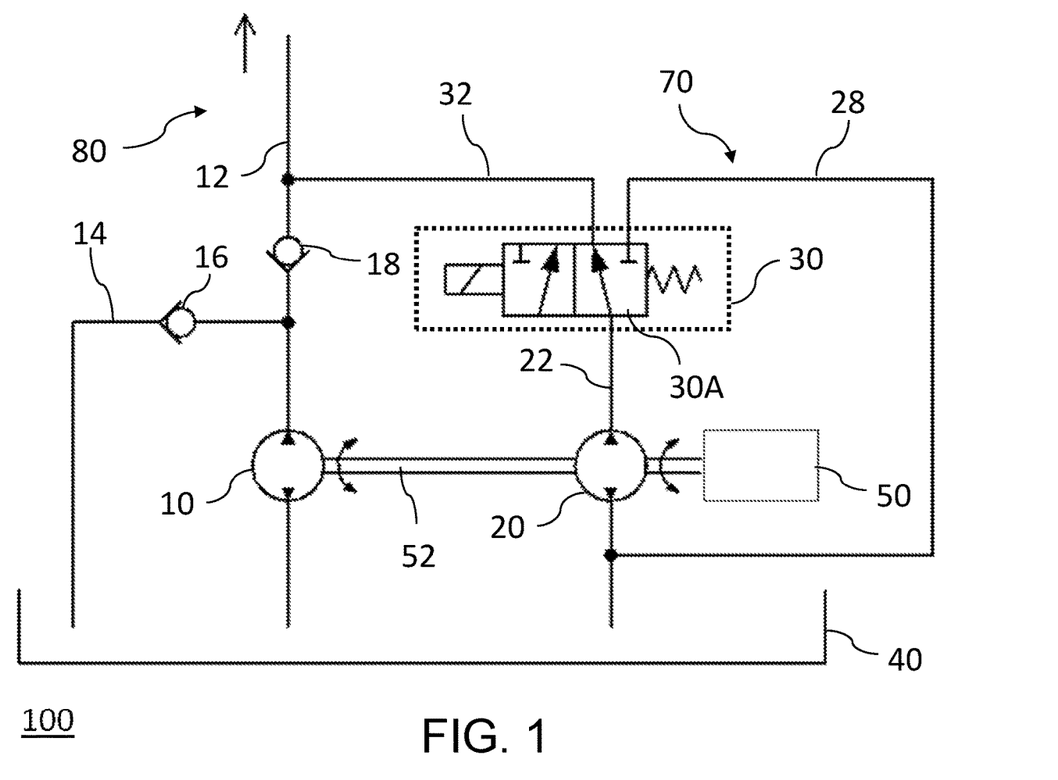
FIG. 1 a schematic view of a device for supplying fluid according to a first embodiment.

FIG. 1 shows a device 100 for supplying fluid to an electric drive train according to the first embodiment.

The apparatus 100 includes two fixed displacement pumps: a main pump 10 configured as a hydraulic fixed displacement pump for delivering fluid from a fluid reservoir 40 to the electric drive train, i.e., to the fluid circuit of the electric drive train, and an auxiliary pump 20 configured as a hydraulic fixed displacement pump. The apparatus 100 may also include a plurality of auxiliary pumps 20.

The main pump 10 and the auxiliary pump 20 are mechanically driven by the gearbox 50 of the electric drive train, such that there is a fixed transmission ratio between a pumping rotational speed of the main pump 10 and a pumping rotational speed of the auxiliary pump 20. In the first embodiment, the main pump 10 and the auxiliary pump 20 are driven by the same gear shaft 52 of the transmission 50 and accordingly have the same rotational speed. Alternatively, the two pumps may each be driven by a different shaft of the gearbox 50 and there may correspondingly be a fixed transmission ratio between the two pumping rotational speeds.

The main pump 10 is fluidically connected via a supply line 12 to the electric drive train for its fluid supply. The electric drive train may be configured in a manner known per se, and may have an electric machine (electric motor) that can be operated as a motor and generator and a gearbox, as well as a fluid circuit for supplying fluid to the electric drive train. Of these, only the gearbox 50 is shown schematically in FIG. 1. The fluid circuit (oil circuit) of the electric drive train serves to cool and lubricate the transmission and to supply oil to the electric motor of the electric drive train. The fluid circuit is supplied with oil from the reservoir 40 via the supply line 12 by means of the pumps 10, 20.

The auxiliary pump 20 is arranged in an auxiliary line 22, wherein the auxiliary pump 20 can be selectively connected by means of a controllable actuating device 30 for supplying fluid to the electric drive train. For this purpose, the auxiliary line 22 can be fluidically connected to the supply line 12 by means of the controllable actuating device 30. In the embodiment, the controllable actuating device 30 is configured to fluidically connect the auxiliary line 22 to the supply line 12 via a connecting line 32. A portion of the volume flow delivered by the auxiliary pump 20 that is not used to supply fluid to the electric drive train can be returned to the fluid reservoir 40 and/or upstream to the auxiliary pump 20 via a return line 28.

Figure 3:
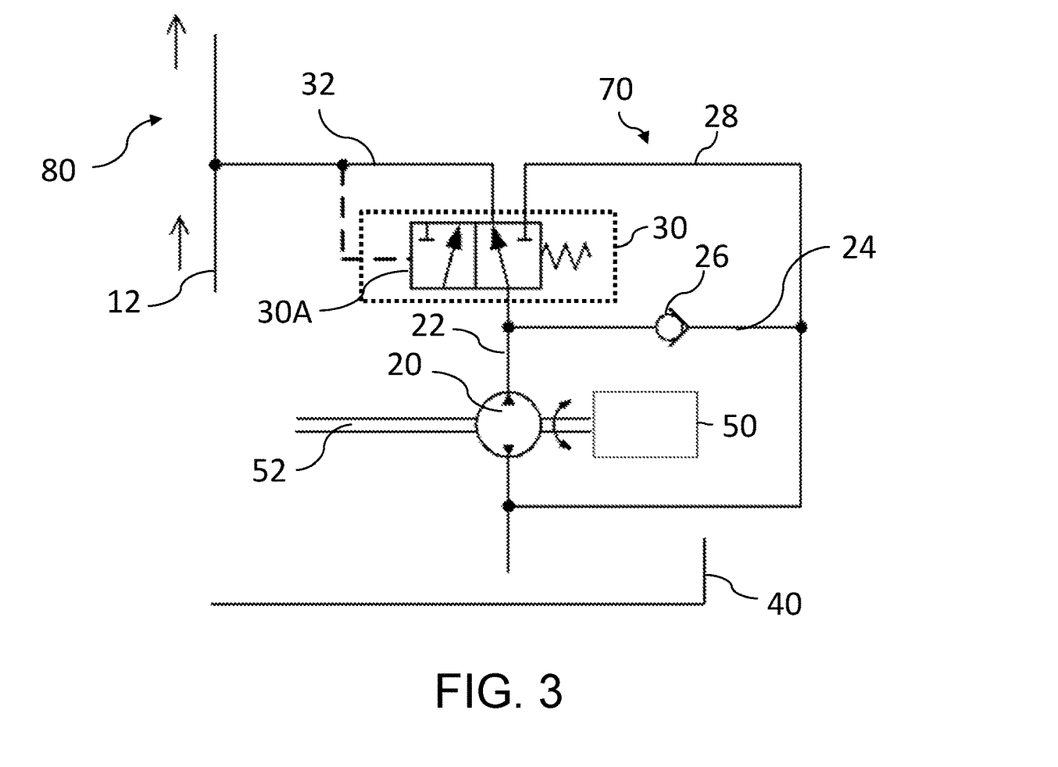
FIG. 3 schematic view of a section of the device for supplying fluid according to a third embodiment.

The controllable actuator 30 comprises a controllable valve device 30A, wherein the controllable valve device 30A can be configured in various ways. In FIG. 1, the valve device 30A is configured as an electrically controlled directional control valve, in particular a 3/2-way valve. The directional control valve 30A can be suitably controlled by a vehicle computer (not shown), as described above. The vehicle computer may control the directional control valve 30A in FIG. 1 as a function of, for example, a measurement signal detected by sensors or provided by a vehicle computer on the basis of physical forces or pressure in the hydraulic circuit 80 of the fluid supply. Furthermore, it is also conceivable that the controllable valve device 30A comprises a controllable directional control valve, preferably a proportional directional control valve, which is otherwise controllable mechanically, hydraulically, pneumatically or electrically. For example, FIG. 3 shows an embodiment with hydraulically controlled directional control valve 30A configured to automatically control the selective engagement of the auxiliary pump as a function of a pressure in the hydraulic circuit 80 of the fluid supply.

The controllable valve device 30A may be switchable between a first position and a second position, wherein the volume flow of the auxiliary pump 20 is completely supplied to the electric drive train in the first position and is circulated only in a subcircuit 70 associated with the auxiliary pump 20 in the second position. The subcircuit 70 includes the auxiliary line 22 and the return line 28. The controllable valve device 30A may be switchable only between the first and second positions, or may additionally be switchable to intermediate positions in which the split of the volume flow is proportional to the valve input signal. Thus, the valve device 30A is switchable such that the total volume flow can be adjusted to the fluid demand of the electric drive train.

A backflow preventer 18, preferably a nonreturn valve, may be disposed downstream of the main pump 10 to prevent fluid backflow in the direction of the main pump 10.

In addition, a first suction line 14 may branch off from the supply line 12 downstream of the main pump 10 and open into the fluid reservoir 40, wherein a first suction valve 16, preferably a check valve, may be arranged in the first suction line 14 to prevent a vacuum at the main pump 10.

The operation of the device 100 depends on the direction of rotation of the transmission 50 or transmission shaft 52, which determines the directions of delivery of the main pump 10 and the auxiliary pump 20. The gearbox 50 has basically two directions of rotation, a first direction of rotation corresponding to a forward driving mode of the motor vehicle and a second direction of rotation may correspond to a reverse driving mode of the motor vehicle.

The first direction of rotation is the direction of rotation of the embodiment in which both pumps 10, 20 draw fluid from the fluid reservoir 40 and deliver the respective volume flow in the direction of the electric drive train, i.e. the main pump 10 into the supply line 12 and the auxiliary pump 20 into the auxiliary line 22 in the direction of the controllable actuator 30. In this direction of rotation, the fluid supply takes place as previously described, i.e. when the auxiliary pump 20 is switched on, the volume flows of the main pump 10 and auxiliary pump 20 add up to supply the electric drive train, and in the non-switched-on state of the auxiliary pump 20, its volume flow is circulated only in a subcircuit 70 assigned to the auxiliary pump 20.

The volume flows of the main pump 10 and auxiliary pump 20 depend on the speed of the gearbox 50, with the proportion of the volume flow delivered by the auxiliary pump 20 and supplied to the electric drive train being regulated by the position of the controllable valve device 30A.

If the gear 50 rotates in the second direction of rotation, fluid can be supplied to the main pump 10 from the fluid reservoir 40 via the first suction line 14. In the first embodiment, the fluid is not delivered into the supply line 12 in the second direction of rotation, but back into the fluid reservoir 40. The main pump 10 is thus operated in recirculating mode.

Figure 2:
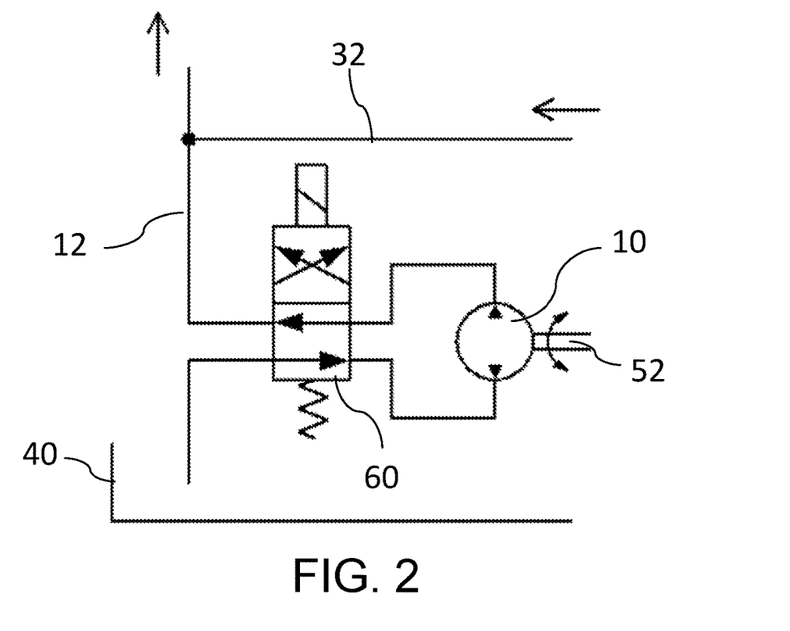
FIG. 2 schematic view of a section of the device for supplying fluid according to a second embodiment.

As shown in FIG. 2, a first reversing valve 60 may alternatively be associated with the main pump 10 to control a flow direction through the main pump 10 in response to a direction of rotation of the transmission 50. The flow direction may be controlled such that the volume flow of the main pump 10 is always delivered to the supply line 12 to supply the electric drive train, and thus the fluid supply can be ensured regardless of the direction of rotation. The actuator 30, the auxiliary pump 20 and its associated subcircuit 70 are not shown in FIG. 2, but may be provided in a manner as in FIG. 1.

As shown in FIG. 3, a second suction line 24 may branch off from the auxiliary line 22 downstream of the auxiliary pump 20 and open into the fluid reservoir 40 or into the auxiliary line 22 upstream of the auxiliary pump 20, wherein a second suction valve 26, preferably a check valve, may be arranged in the second suction line 24 to prevent an underpressure at the auxiliary pump 20.

By means of the second secondary suction line 24, the auxiliary pump 20 can also be operated in recirculating mode if the gearbox 50 rotates in the second direction of rotation. In this case, fluid can be supplied to the auxiliary pump 20 from the fluid reservoir 40 via the second suction line 24.

Alternatively, the main pump 10 and the auxiliary pump 20 may be configured to supply the electric drive train with the fluid flow of only one of the two pumps at a time for both directions of rotation of the transmission 50. For example, the main pump 10 can be operated in recirculating mode when the speed of the transmission 50 is reversed, in particular when the transmission 50 is rotating in the second direction of rotation when the motor vehicle is reversing, and the fluid supply for the electric drive train can be conveyed exclusively by the auxiliary pump 20. For this purpose, the controllable actuating device 30 can be configured to switch on the auxiliary pump 20 only when the speed of the transmission 50 is reversed. In this way, the electric drive train can be supplied with fluid only by the main pump 10 when the motor vehicle is moving forward, while the auxiliary pump 20 is switched to circulating mode, and can be supplied with fluid only by the auxiliary pump 20 when the motor vehicle is moving backward, while the main pump 10 is switched to circulating mode.

Figure 4:
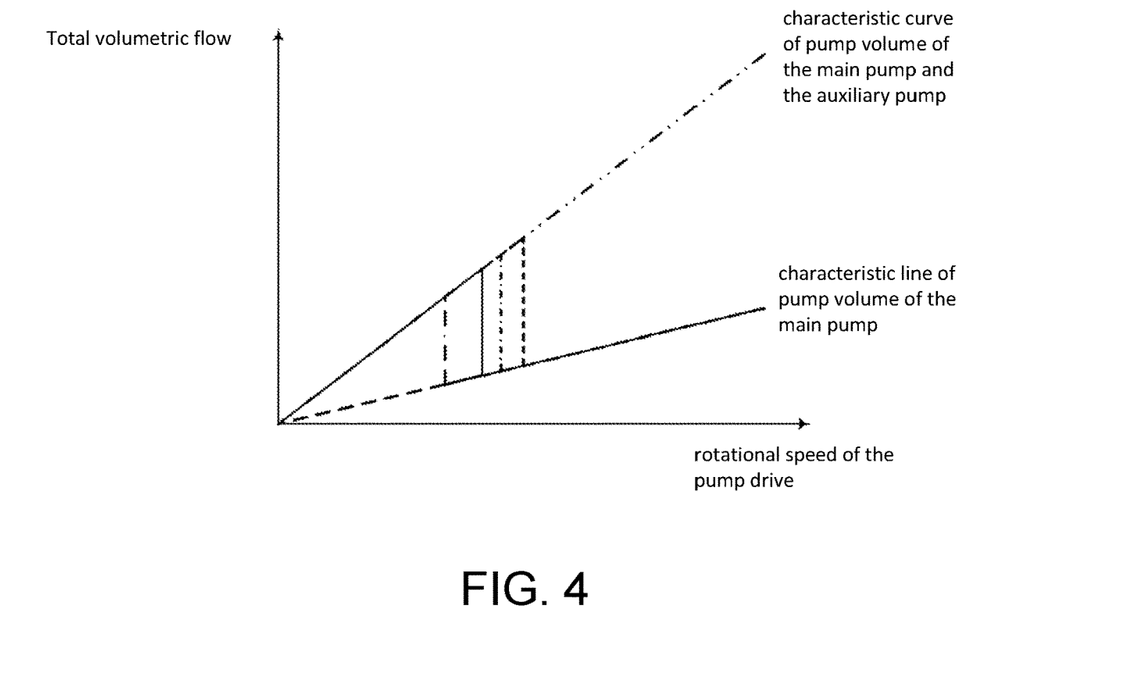
FIG. 4 a diagram of the total volume flow as a function of a gearbox speed according to the first embodiment.

FIG. 4 illustrates a possible composition of the total volume flow for one direction of rotation of the transmission 50, preferably for the first direction of rotation in forward driving mode of the motor vehicle, and sum operation for the first embodiment. The diagram shows the total volume flow, which is composed of the volume flow of the main pump 10 and, if applicable, of the auxiliary pump 20, as a function of the rotational speed of the transmission 50. First of all, the linear relationship between the volume flows of the two constant displacement pumps and the rotational speed can be seen.

Shown is the joint delivery of main and auxiliary pump in the lower rotational speed range. Thus, a high total volume flow is optionally ensured even at low speeds. Above a certain pumping rotational speed, the valve device 30A is controlled, e.g. as a function of one or more operating parameters, and the auxiliary pump 20 is disconnected from the hydraulic circuit 80 of the fluid supply. Accordingly, only the main pump 10 delivers fluid into the hydraulic circuit 80. In this example, the auxiliary pump 20 either connects 100% to the main pump 10 or delivers fluid only internally in the subcircuit 70. Alternatively, intermediate positions of the valve device 30A are also conceivable, i.e., the distribution of the volume flow of the auxiliary pump 20 may be proportional to the valve input signal. Thus, the auxiliary pump 20 may also contribute any volume flow between zero and a maximum flow rate to the main pump 10.

The invention is not limited to the preferred embodiments described above. Rather, a large number of variants and variations are possible which also make use of the inventive concept and therefore fall within the scope of protection. In particular, the invention also claims protection for the subject matter and the features of the dependent claims independently of the referenced claims. In particular, the individual features of independent claim 1 are each independently disclosed. In addition, the features of the dependent are also disclosed independently of all the features of independent claim 1.

LIST OF REFERENCE SIGNS

10 Main pump
12 Supply line
14 First suction line
16 First suction valve
18 Backflow preventer
20 Auxiliary pump
22 Auxiliary line
24 Second suction line
26 Second suction valve
28 Return line
30 Actuator
30A valve device
32 Connecting line between auxiliary and supply line
40 Fluid reservoir
50 Gearbox
52 Gear shaft 60 First reversing valve
70 Subcircuit
80 Hydraulic circuit of the fluid supply
100 Fluid supply system

The invention claimed is:

1. Device for supplying fluid to an electric drive train for a motor vehicle comprising
a main pump configured as a hydraulic fixed displacement pump for delivering fluid from a fluid reservoir to an electric drive train; and
at least one auxiliary pump configured as a hydraulic fixed displacement pump,
wherein the main pump and the auxiliary pump are mechanically driven by a transmission of the electric drive train in such a way that a fixed transmission ratio exists between a pumping rotation speed of the main pump and a pumping rotation speed of the auxiliary pump, and wherein the auxiliary pump can be selectively connected by means of a controllable actuating device for supplying fluid to the electric drive train,
wherein the main pump is fluidically connected to the electric drive train via a supply line and the auxiliary pump is arranged in an auxiliary line, wherein the auxiliary line can be fluidically connected to the supply line by means of the controllable actuating device in order to connect the auxiliary pump for supplying fluid to the electric drive train,
wherein a first suction line branches off from the supply line downstream of the main pump and opens into the fluid reservoir, wherein
a) a first suction valve is arranged in the first suction line for preventing an underpressure at the main pump, and
b) fluid is supplied to the main pump via the first suction line during a direction of rotation of the transmission corresponding to a reverse drive mode of a motor vehicle.

2. The device for supplying fluid according to claim 1, wherein the main pump and the auxiliary pump are
a) driven by the same gear shaft of the gearbox and accordingly have the same rotational speed, or
b) each driven by a different shaft of the gear unit and there is accordingly a fixed transmission ratio between the two pumping rotation speeds.

3. The device for supplying fluid according to claim 1, wherein the actuator is configured to return a portion of a volumetric flow delivered by the auxiliary pump, which is not used to supply fluid to the electric drive train, to the fluid reservoir and/or upstream to the auxiliary pump via a return line.

4. The device for supplying fluid according to claim 1, wherein the first suction valve comprises a nonreturn valve.

5. The device for supplying fluid according to claim 1, wherein the device is configured in such a way that, when the auxiliary pump is switched on, volumetric flows of the main pump and auxiliary pump are added to supply the electric drive train and, in a non-switched-on state of the auxiliary pump, its volumetric flow is circulated only in a subcircuit assigned to the auxiliary pump.

6. The device for supplying fluid according to claim 1, wherein:
the device is a device for supplying fluid for cooling and lubricating a transmission; or
the device is a device for supplying oil to an electric motor of the electric drive train; or
the device is operable in a neutral position of the transmission.

7. The device for supplying fluid according to claim 1, wherein the controllable actuator comprises a controllable valve device.

8. The device for supplying fluid according to claim 7, wherein:
the controllable valve device is a mechanically, hydraulically, pneumatically or electrically controllable directional control valve; or
the controllable valve device is a proportional directional control valve; or
the controllable valve means comprises a hydraulically controlled directional control valve adapted to automatically control the selective engagement of the auxiliary pump as a function of at least one state variable in the hydraulic circuit of the fluid supply.

9. The device for supplying fluid according to claim 7, wherein the controllable valve device is switchable between a first position and a second position, wherein in the first position a volumetric flow of the auxiliary pump is completely supplied to the electric drive train and in the second position is circulated only in a subcircuit associated with the auxiliary pump, wherein the controllable valve device
a) can only be switched between the first and second position, or
b) can additionally be switched to intermediate positions in which the distribution of the volumetric flow is proportional to a valve input signal.

10. The device for supplying fluid according to claim 7, wherein the controllable valve device comprises an electrically controllable valve device and wherein the device is configured to electrically control the valve device as a function of at least one of the following variables: a data bus signal, a measurement signal detected by sensors or provided by a vehicle computer, a gear ratio of the transmission, or on the basis of physical forces or pressure in the hydraulic circuit of the fluid supply.

11. The device for supplying fluid according to claim 10, wherein:
the electrically controllable valve device comprises an electrically controllable directional control valve; or
the data bus signal comprises a CAN signal.

12. The device for supplying fluid according to claim 1, further comprising a backflow preventer arranged downstream of the main pump for preventing fluid backflow in the direction of the main pump.

13. The device for supplying fluid according to claim 12, wherein:
the backflow preventer comprises a nonreturn valve; or
the backflow preventer is arranged downstream of the main pump preventing fluid backflow in the direction of the main pump when the speed of the transmission is reversed; or
the backflow preventer is arranged downstream of the main pump preventing fluid backflow in the direction of the main pump during reverse driving.

14. A motor vehicle comprising a device for supplying fluid according to claim 1.

15. The motor vehicle of claim 14, wherein:
the motor vehicle is a commercial vehicle; or
the motor vehicle is a commercial vehicle for transporting goods or passengers with a maximum permissible speed greater than 60 km/h.

16. Device for supplying fluid to an electric drive train for a motor vehicle comprising
a main pump configured as a hydraulic fixed displacement pump for delivering fluid from a fluid reservoir to an electric drive train; and at least one auxiliary pump configured as a hydraulic fixed displacement pump, wherein the main pump and the auxiliary pump are mechanically driven by a transmission of the electric drive train in such a way that a fixed transmission ratio exists between a pumping rotation speed of the main pump and a pumping rotation speed of the auxiliary pump, and wherein the auxiliary pump can be selectively connected by means of a controllable actuating device for supplying fluid to the electric drive train, wherein the main pump is fluidically connected to the electric drive train via a supply line and the auxiliary pump is arranged in an auxiliary line, wherein the auxiliary line can be fluidically connected to the supply line by means of the controllable actuating device in order to connect the auxiliary pump for supplying fluid to the electric drive train, wherein a second suction line branches off from the auxiliary line downstream of the auxiliary pump and opens in the fluid reservoir or in the auxiliary line upstream of the auxiliary pump, wherein a) a second suction valve is arranged in the second suction line for preventing an underpressure at the auxiliary pump, and b) fluid is supplied to the auxiliary pump via the second suction line when the direction of rotation of the transmission corresponds to reverse operation of a motor vehicle.

17. The device for supplying fluid according to claim 16, wherein the second suction valve comprises a nonreturn valve.

18. Device for supplying fluid to an electric drive train for a motor vehicle comprising a main pump configured as a hydraulic fixed displacement pump for delivering fluid from a fluid reservoir to an electric drive train; and at least one auxiliary pump configured as a hydraulic fixed displacement pump, wherein the main pump and the auxiliary pump are mechanically driven by a transmission of the electric drive train in such a way that a fixed transmission ratio exists between a pumping rotation speed of the main pump and a pumping rotation speed of the auxiliary pump, and wherein the auxiliary pump can be selectively connected by means of a controllable actuating device for supplying fluid to the electric drive train, wherein the main pump is operated in recirculating mode during a speed reversal of the transmission and the controllable actuator is configured to connect the auxiliary pump only during the speed reversal of the transmission so that the electric drive train is during forward travel of a motor vehicle, only supplied with fluid by the main pump, while the auxiliary pump is switched to circulating operation, and during reverse operation of the motor vehicle, only supplied with fluid by the auxiliary pump while the main pump is switched to circulation.

19. The device for supplying fluid according to claim 18, wherein the main pump is operated in recirculating mode during reverse driving of the motor vehicle.

20. Device for supplying fluid to an electric drive train for a motor vehicle comprising a main pump configured as a hydraulic fixed displacement pump for delivering fluid from a fluid reservoir to an electric drive train; and at least one auxiliary pump configured as a hydraulic fixed displacement pump, wherein the main pump and the auxiliary pump are mechanically driven by a transmission of the electric drive train in such a way that a fixed transmission ratio exists between a pumping rotation speed of the main pump and a pumping rotation speed of the auxiliary pump, and wherein the auxiliary pump can be selectively connected by means of a controllable actuating device for supplying fluid to the electric drive train, wherein the main pump is fluidically connected to the electric drive train via a supply line and the auxiliary pump is arranged in an auxiliary line, wherein the auxiliary line can be fluidically connected to the supply line by means of the controllable actuating device in order to connect the auxiliary pump for supplying fluid to the electric drive train, wherein a) a first reversing valve is associated with the main pump and controls a direction of flow through the main pump in dependence on a direction of rotation of the transmission, or b) a second reversing valve is associated with the auxiliary pump which controls a flow direction through the auxiliary pump as a function of a direction of rotation of the transmission, wherein the main pump being assigned a shut-off valve for uncoupling the main pump from the supply line in the event of a speed reversal of the transmission.

21. The device for supplying fluid according to claim 20, wherein the main pump being assigned a shut-off valve for uncoupling the main pump from the supply line during reverse driving of the motor vehicle.

\* \* \* \* \*